INVENTOR.
JOHN W. HORTON

BY Joe L. Koerber

ATTORNEY

United States Patent Office 3,387,285
Patented June 4, 1968

3,387,285
SPECTRALLY CODED DATA STORAGE

John W. Horton, New York, N.Y., assignor to International Business Machines Corporation, New York, N.Y., a corporation of New York Filed Dec. 23, 1963, Ser. No. 332,607
17 Claims. (Cl. 340—173)

ABSTRACT OF THE DISCLOSURE

A plurality of data storage bins are arranged in a column with the data in each bin being composed of one or more different elements each having different spectral characteristics. Light is passed through a bin and is applied to a spectroscope which disperses the spectral lines of each element in an absorption spectrum having sectors corresponding to the storage positions of the column. Particular ones of the spectral lines corresponding to each element are selected for detection.

This invention relates to data storage utilizing multiple quantitization of a spot in a storage medium and more particularly to multiple quantitization utilizing a number of chemical elements or compounds, each having binary significance in accordance with its presence or absence, with its presence being manifested by characteristic spectral lines.

Most storage media currently in widespread use utilize a property of the medium in binary quantitization. For example, magnetization is to the left or to the right; the magnetization is either present or not present; the storage medium is either there or it is not there (hole in a card); the emulsion is either clear or it is dark.

The present invention utilizes multiple quantitization of a spot whereby, for example, using five different elements, each having a unique binary value designation and being either present or absent, 32 distinct combinations may be recorded on a single spot. Six elements provide 64 combinations; seven elements provide 128 combinations, etc. The presence of a particular element is determined by detection of a characteristic spectral line.

One known form of multiple quantitization is various gradations of transparency in black and white film. However, discrimination between the various degrees of transparency may present problems. Also, overdevelopment or underdevelopment could result in radical errors in the recorded data. Furthermore, such a storage device consists essentially of a single data channel. In the present invention, these problems are avoided.

An absorption spectrum results when radiation having a continuous spectrum is passed through a selectively absorbing medium. The absorption spectrum shows gaps (dark lines or spaces) at wavelengths which are characteristic of the particular medium. Rare earth elements or salts thereof exhibit sharp absorption lines throughout the visible spectrum. These lines characteristically are 1–5 A. (Angstroms) wide. Thus, in the red portion (approximately 50 A. wide), for example, 10 to 100 lines might be identified.

The prior art includes a patent application Ser. No. 162,095, filed Dec. 26, 1961, on behalf of D. D. Sliter and R. M. Chadly, now Patent No. 3,148,355, and assigned to the assignee of the present invention. In the above application which is entitled "Data Storage in Color Film," the properties of color film are utilized to store information using the principle of multiple quantitization of a single area. Each incremental area of the color film emulsion is controllably exposed to one or more of a selected group of colors so as to store in each of the incremental areas of the color film emulsion a unique representation of the one or more colors.

Assuming that five colors are utilized, each having a distinct binary value designation, a $2^5$ bit storage bin is obtained in each resolution area of the color film. This means, for example, that each resolution area of the film is capable of storing any one of thirty-two characters or words, each being represented by a five bit binary code. To expand the number of combinations, additional colors or distinct intensities of the colors could be assigned binary values.

To read out the data stored in the different resolution areas of the color film, light is projected through the film and the transmitted light is broken down by light filters into its color components. The color or intensity level of each of these color components in the transmitted light is determined, and the combination of colors and intensity levels for the different colors is decoded to determine the identity of the stored data.

In the present invention the presence or absence of particular elements is not determined by color as in the above application but rather is determined in accordance with the presence or absence of characteristic spectral lines of the elements.

Accordingly, it is a primary object of this invention to provide an improved multiple quantitized storage device.

Another object of this invention is to provide an improved spectrally coded storage device.

A further object of this invention is to provide multiple quantitized recording of data wherein each quantity is represented by an element having distinctive spectral lines.

A still further object of this invention is to provide a multiple quantitized storage device wherein each quantity consists of an inorganic compound having uniquely identifiable spectral lines.

Another object of this invention is to provide a multiple quantitized storage device wherein each quantity consists of a rare earth element having uniquely identifiable spectral lines.

Another object of this invention is to provide an improved storage system providing two-dimensional accessing of a three-dimensional memory.

Another object of this invention is to provide an improved read only memory of high capacity.

Another object of this invention is to provide an improved three-dimensional memory with two axes selected by physical positioning and the third axis by use of frequency bands.

Yet another object of this invention is to provide an improved memory having multiple quantitized storage areas, each storage area consisting of one or more elements each having a designated value and signifying its presence by absorbing light of a given frequency.

Another object of this invention is to provide an improved multiple quantitized storage device wherein each quantity has a distinct value and is expressed in binary notation by its presence or absence.

The foregoing and other objects, features and advantages of the invention will be apparent from the following more particular description of a preferred embodiment of the invention, as illustrated in the accompanying drawings.

*General*

Figure 1:
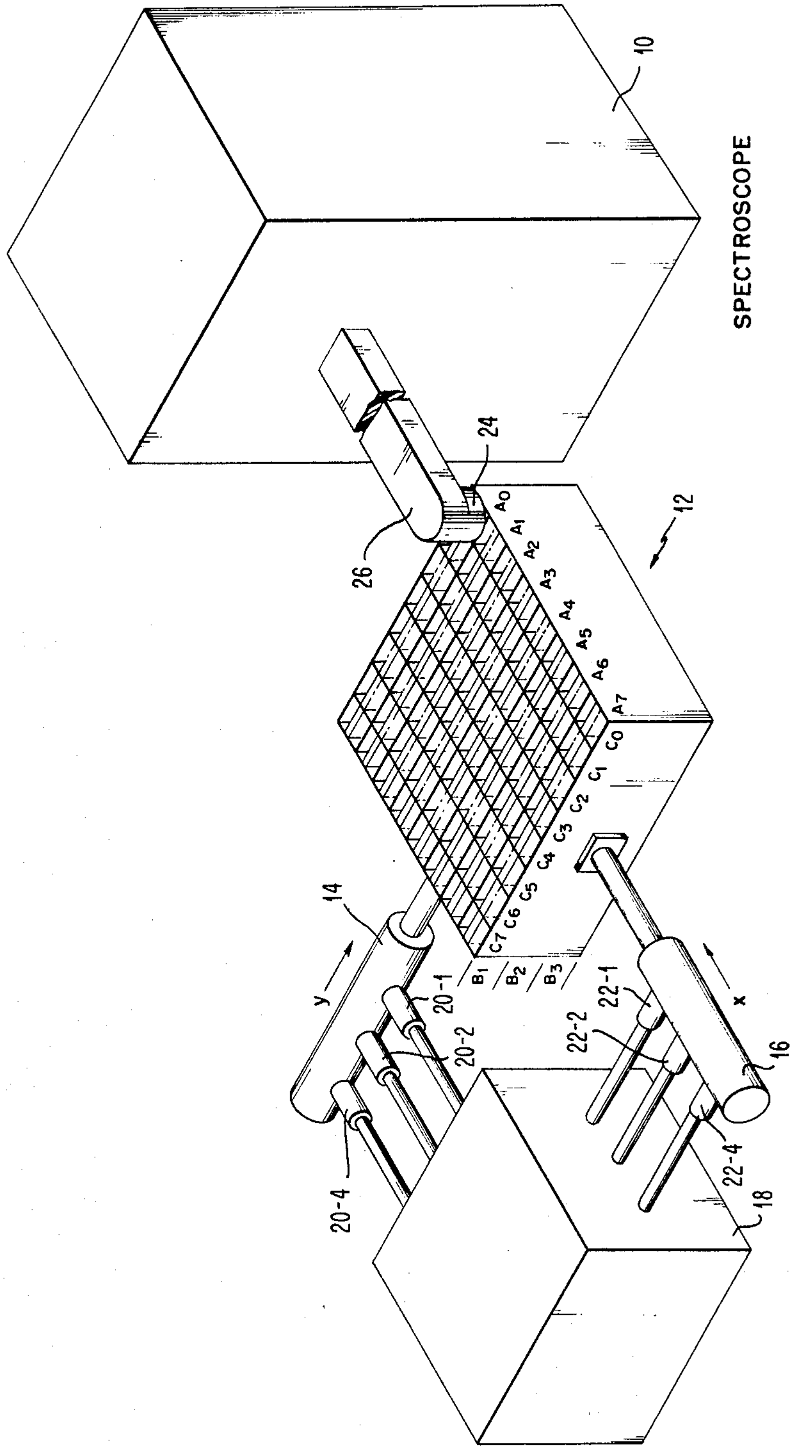
FIGURE 1 is a perspective view of a schematic representation of the storage system.

In general this invention includes a plurality of storage arrays, each array having plural storage positions (bins) arranged in rows and columns. In each storage bin, storage is accomplished by placing selected combinations of materials each of which has been assigned a unique binary value. For example, three different materials may be given binary values of 1, 2 and 4. Each binary value is included or not included in a bin in accordance with the presence or absence of the particular material having that binary value. These different materials are applied to the storage area in accordance with the value to be represented by their binary sum.

Storage of coded data in the foregoing manner provides a very compact read only memory. When light is passed through a storage bin, the output light is examined by a spectroscope and the presence of each particular element is detected by photoresponsive elements which detect the presence of characteristic spectral lines.

Coincident read out of all bins in a selected column is accomplishd by providing a unique band pass (color) filter for each bin of a column whereby each bin is represented in a portion of the total spectrum corresponding to the band of wavelengths of light which is passed by a particular filter. A simple logical circuit combines the outputs of the photoresponsive devices to indicate which of the elements are present in a given bin. Each detected combination will have a meaning which can be indicated in any suitable way.

In the illustrated embodiment, the principle of the invention is taught utilizing a small scale memory consisting of eight storage arrays each having eight columns and three rows of bins. Also, in the illustrated embodiment, only three elements having binary values 1, 2 and 4 are shown. However, it will be apparent that the number of arrays and the number of columns per array may be increased greatly, limited only by restraints imposed by the problem of physical handling and accessing. While the illustrated embodiment shows movement of the storage array, it may be desirable in some instances, for example with a very large memory array, to move the transducer instead.

The number of bins per column and the number of elements per bin may be expanded greatly, limited only by the number of different frequency bands which may be separated and within which uniquely identifiable spectral lines of all the selected elements can be encompassed. Also there can be a trade-off between the number of bins and the number of elements per bin, depending upon how the store is to be used.

Allotting four mils thickness to each of three chemical elements in a bin and four mils for a light pipe on each side of a bin, the storage array would be 20 mils thick. Allotting 10 mils square for each bin and providing multiple bins per column, the immense capacity of a physically small memory array may be envisioned.

It will be apparent that, for a memory of a given size and capacity, the positioning tolerances on the X and Y axes may be greatly relaxed by providing additional capacity in a third dimension.

Referring to FIGURE 1, the system includes a spectroscope 10, a storage array 12, piston adders 14 and 16 and a unit 18 for providing actuating fluids selectively through tubes 20–1, 20–2, 20–4 and 22–1, 22–2 and 22–4 to adders 14 and 16 respectively to position the memory 12 with respect to a transducer 24 attached to the spectroscope 10 by an arm 26.

Figures 2, 5:
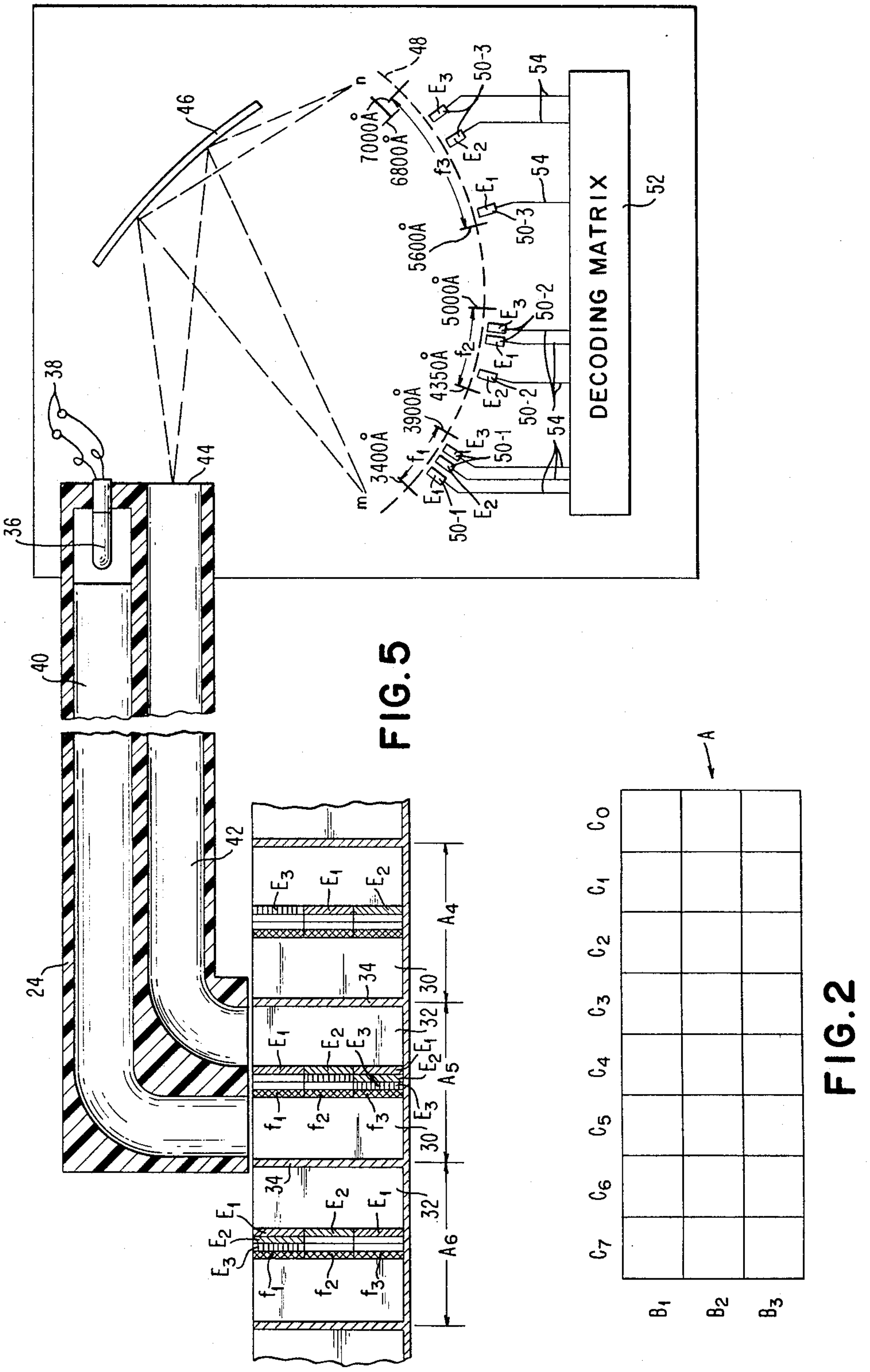
FIGURE 2 is a view of one of the plurality of storage bin arrays which make up the storage device.
FIGURE 5 is a schematic representation of the apparatus for reading out the storage device and analyzing its contents.

The memory array 12 consists of eight two-dimensional arrays of storage bins designated $A_0$–$A_7$. Referring to FIGURE 2, a single one of the arrays A is illustrated and consists of three rows of bins designated $B_1$, $B_2$, $B_3$, arranged in eight columns designated $C_0$–$C_7$.

Figure 3:
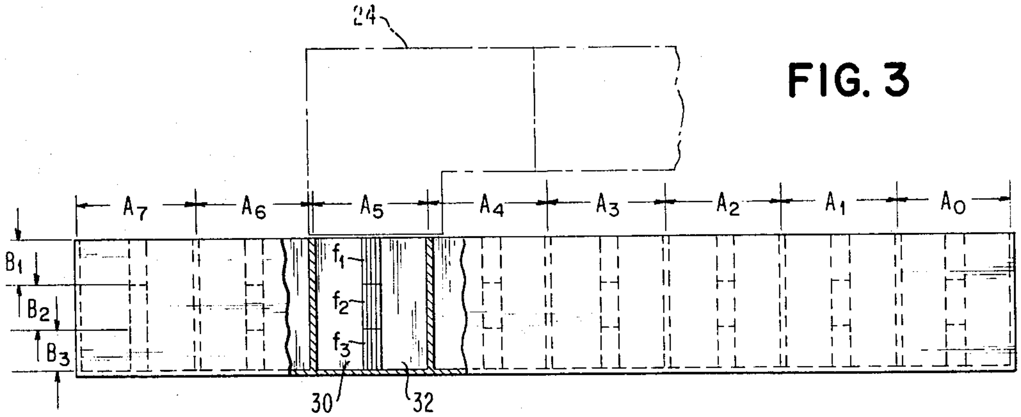
FIGURE 3 is a side view of the storage device partly broken away.

Referring to FIGURE 3, a side view of the storage device 12 is shown with the outer wall partially broken away to expose the end column of bins of the array $A_5$. The transducer 24 is shown in phantom outline above this array. In FIGURE 5, the bin $A_5$ is shown in even greater detail. An input light pipe 30 extends from top to bottom along the left hand side of the column of bins. An output light pipe 32 extends from bottom to top along the right hand side. Between the two light pipes, three bins are illustrated, each bin comprising a light filter ($f$) and up to three data elements. Filters $f_1$, $f_2$ and $f_3$ correspond respectively to bins $B_1$, $B_2$ and $B_3$. In this illustration three rectangular sections are shown in each bin to represent the binary coded elements which may be present. Each input light pipe 30 is separated from the adjacent output light pipe 32 by a wall 34.

For the purposes of this illustration salts of the three elements neodymium, holmium and europium are designated as elements $E_1$, $E_2$ and $E_3$ respectively. Using these three elements it is necessary to select the filters $f_1$, $f_2$ and $f_3$ associated with bins $B_1$, $B_2$ and $B_3$, respectively, to each pass a band of light wave frequencies which encompasses at least one distinguishable spectral line of each of the elements $E_1$, $E_2$ and $E_3$.

For the elements $E_1$, $E_2$ and $E_3$, three filters which may be used are commercially available and are identified in Bulletin CF–1, Glass Color Filters, published by Corning Glass Works, Corning, N.Y., Optical Sales Department (1960). The filters $f_1$, $f_2$ and $f_3$ may be Corning filters C.S. (color specification) 7–83, 5–75 and 3–67 respectively. The approximate band passes of these filters are shown in the following chart.

| f | Corning Filter, C.S. | Approximate Band Pass, A. |
|---|---|---|
| $f_1$ | 7–83 | 3,400–3,900 |
| $f_2$ | 5–75 | 4,350–5,000 |
| $f_3$ | 3–67 | 5,600–α |

While the storage bins have been illustrated in FIGURES 3 and 5 as rectangular areas having substantial width, it will be understood that the elements would usually be deposited in very think layers by vacuum deposition, spraying, painting, etc. and would be of minute thickness.

The array A in FIGURE 2 is schematically separated into twenty-four rectangular areas. However, the array could take many forms. For example, it could be a rectangular glass plate with the elements $E_1$, $E_2$ and $E_3$ deposited in bin positions. It could be an assembly of individual rectangular elements. Another variation which would make the storage array adaptable to changes in content is to make the individual bins or columns of bins or arrays removable for updating or for replacement by new ones.

The elements $E_1$, $E_2$ and $E_3$ could be deposited, for example, on the right hand bin wall which could well be the surface of the output light pipe or on the corresponding filter ($f$). The elements may be deposited one on top of the other or they may be applied in one application by mixing together in various combinations or by simultaneously evaporating selected elements onto the bin location. The method of applying the elements to the bins is not part of the invention and any suitable way would suffice.

To operate the apparatus to determine the contents of a bin at a particular address, the device 18 in FIGURE 1 is actuated by any suitable means, for example, a punched card input having a three-bit binary coded X address for array selection and a three-bit binary coded Y address for column selection. It is not necessary to specify a particular bin address since all bins in the selected column are interrogated simultaneously. The contents of the three bins are read out simultaneously and the particular bin is determined in a manner described hereinafter.

The piston adders 14 and 16 are of conventional design having one unit, two unit and four unit increments of movement which can be used selectively to provide zero to seven increments of movement, thereby providing eight discrete positions. Since the means for operating such piston adders in response to address inputs are not part of this invention and are within the skill of the art to build, no further description is provided.

Referring to FIGURE 5, the transducer 24 is shown positioned to read a particular column of bins in array $A_5$. A source of light represented by a bulb 36 connected to a power source represented by a pair of terminals 38 illuminates the end of a light pipe 40 whereby light is transmitted to the input light pipe 30 of the selected column of bins. Portions of the light pass through the filters $f_1$, $f_2$ and $f_3$ and through all of the elements $E_1$, $E_2$ and $E_3$ which may be present in the bins $B_1$, $B_2$ and $B_3$. Each column of bins in each of the arrays has the identical filters $f_1$, $f_2$ and $f_3$.

The light emerging from the three bins passes through the output light pipe 32 and into the end of a light pipe 42 in the transducer 24. The light passes from the light pipe 42, and is applied to the spectrometer 10.

Each light pipe 40 or 42 may be a single light transmitting element but may also consist of a bundle of small light fibers. The use of fibers is particularly desirable since the output ends at the spectroscope can be aligned to simulate the usual light admitting slit of the spectroscope. With such an arrangement, the image of the simulated light slit is imaged by the spectroscope to produce the conventional spectral lines.

The spectroscope 10 may be of conventional design. The one illustrated in FIGURE 5 is known as Paschen's mounting and comprises a slit which is represented by the end of the light pipe 42 and is designated 44, a concave diffraction grating 46 and a focal plane which is represented by the dotted line 48, and which is known as the Rowland circle.

This type of spectroscope provides spectra of several orders along the line 48. In the present embodiment, only one order is utilized. However, use of more than one order to accommodate the physical size of analyzing apparatus described below, or for other reasons, is within the scope of this invention. Also, the scale of the spectrum represented by the line 48 is exaggerated relative to the remainder of the spectroscope for ease of illustration.

Accordingly, one spectral order is represented by the line 48 between the points *m* and *n*. The span *mn* is divided into several sections in accordance with the approximate wavelengths of light represented in the spectrum. Certain sections are designated $f_1$, $f_2$ and $f_3$ respectively in accordance with the wavelengths of light passing by the bin filters having similar designations.

Figure 6:
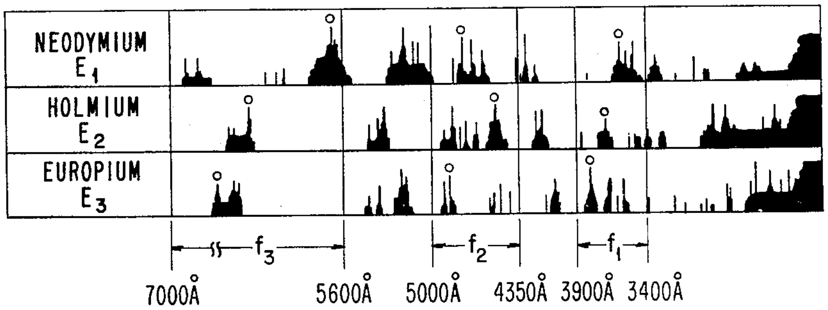
FIGURE 6 is a spectral chart divided into frequency bands.

Referring to FIGURE 6, spectral lines characteristic of the elements $E_1$, $E_2$ and $E_3$ are represented as well as the band pass of the filters $f_1$, $f_2$ and $f_3$. The spectral lines of FIGURE 6 were derived from an aqueous solution of the named elements. In certain light bands, the spectral lines are so close that they merge as shown by the broader dark areas in FIGURE 6. For illustrative purposes, certain spectral lines for each of the elements in each of the band passes are selected as the ones to be detected to indicate the presence of the element in the respective bins. Each selected line is indicated by a circle above it. It is noted that the selected lines of the elements within each band pass are not in vertical alignment in FIGURE 6. That is, they occur at different wavelengths. This is necessary since detection of spectral lines of two or more elements at the same wavelength would be difficult or impossible.

Referring to FIGURE 5, a series of photodiodes generally designated 50 are arranged in an arc along the line 48. Multiple images of slit 44 are focused at line 48. Each spectral line shown in FIGURE 6 is an image of the slit 44 indicating that light is absorbed by the element at that wavelength. The photodiodes 50 are divided into three groups 50–1, 50–2 and 50–3 corresponding to the sections $f_1$, $f_2$ and $f_3$ between points *m* and *n*. The photodiodes in each group are positioned within their respective regions $f_1$, $f_2$ and $f_3$ at the locations where the selected spectral lines will be focused if the corresponding elements are present in the interrogated bins.

These diodes in each group have further designations of $E_1$, $E_2$ and $E_3$ corresponding to the particular elements they detect. It is noted that the order of arrangement of the diodes in the various groups varies in accordance with the position of the selected spectral lines in FIGURE 6.

The photodiodes 50 are connected to a decoding matrix 52 via lines 54.

Since the spectral orders overlap, it is necessary to place a filter 60 over a portion of the span *mn* to eliminate the spectral lines of the next higher order. These overlapping spectral lines would be superimposed at a wavelength related to the original line multiplied by a factor of two. For example, a line at 3400 A. would also appear on the same spectral order at 6800 A. Since, in the illustrated embodiment, use is not made of any spectral line below 3400 A., the wavelengths below 3400 A. are filtered out. This may be accomplished by an appropriate filter at one of several points in the system. The most convenient location is at the bins where it may be combined with the filters $f_1$, $f_2$ and $f_3$. Therefore, it will be understood that, in the present embodiment, the filters $f_1$, $f_2$ and $f_3$ have the characteristics previously described, and in addition, filter out all frequencies below 3400 A.

The filter 60 is inserted on the Rowland circle 48 in the position between 6800 and 7000 A. Referring to FIGURE 6, the shortest wavelength line which is used is somewhat above 3400 A. and the longest wavelength line used is somewhat below 7000 A. Therefore, for the specific lines used, the filter 60 may not be required. However, for other selected spectral lines, the filter would be necessary.

If one of the bins through which a band of frequencies passes does not contain one or more of the elements $E_1$, $E_2$ or $E_3$, that portion of the spectrum falling upon the group of diodes 50 associated with that bin will be unbroken and light will fall upon each of the photodiodes in that group thereby activating them. If one or more of the elements $E_1$, $E_2$, $E_3$ is present in the bin the spectrum will have spectral lines in the sector corresponding to that bin, that is, absence of light due to heavy absorption of light at a frequency position in the spectrum adjacent to a given diode, whereby the diode corresponding to that frequency will not be lighted and will not be activated.

While a photodiode has been shown for only one spectral line for each element of each bin, it will be apparent that multiple diodes for multiple lines may be provided to detect an element. Also, it will be apparent that one or more diodes may be placed at positions where a spectral line should not occur for a particular element. The outputs of these additional diodes may be combined in known ways to enhance the operation of the device. Such combinations also will facilitate the selection of additional band passes to permit greater numbers of bins per column as well as greater numbers of elements per bin.

Figure 4:
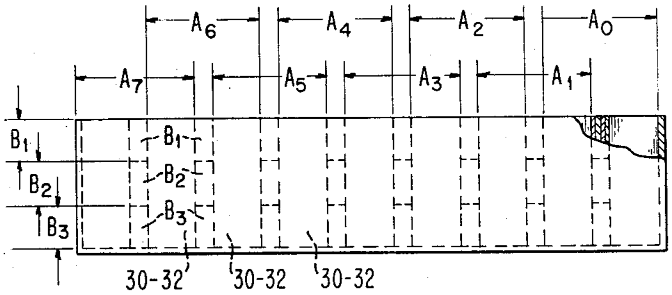
FIGURE 4 is an alternate embodiment of the storage device shown in FIGURE 3.

FIGURE 4 shows a variation in the storage device which affords a saving in the number of elements and space requirements. In this configuration, each light pipe is designated 30–32 since the output light pipe for one column of bins serves also as the input light pipe for the column of bins to the right thereof. In a storage device having eight arrays $A_0$–$A_7$, as illustrated in FIGURE 3, only nine light pipes rather than sixteen are required.

While the invention has been illustrated utilizing band pass filters for the bins and storing a multiple bit word per bin, variations of the coding scheme will be apparent. For example, the filters may be omitted and a word may be stored down the length of a column of bins by providing a coding scheme where each element is assigned a bin position and a word is stored by the application of elements in selected combinations. Another variation using filters is to store multiple bit characters in the bins and to have multiple character words stored in a column.

While the invention has been particularly shown and described with reference to a preferred embodiment thereof, it will be understood by those skilled in the art that various changes in form and details may be made therein without departing from the spirit and scope of the invention.

What is claimed is:

1. A data storage system comprising:
means for storing data in a column of light transmitting storage positions utilizing a plurality of recording elements each having distinctive spectral characteristics and combined in each storage position in accordance with a predetermined code,
means for applying light to said column of storage positions;
means for passing a distinct and non-overlapping band of said light through each said storage position;
means for dispersing the light transmitted by said storage positions in an absorption spectrum having sectors corresponding to the storage positions of said column; and
means for analyzing the sectors of said absorption spectrum to determine the data content of the corresponding storage positions of said column.

2. A data storage system comprising:
means for storing data in a plurality of columns of light transmitting storage positions utilizing a plurality of recording elements each having distinctive spectral characteristics and combined in each storage position in accordance with a predetermined code,
means for selecting a particular column of storage positions;
means for applying light to said selected column of storage positions;
means associated with each said column of storage positions for passing a distinct and non-overlapping band of said applied light through each said storage position;
means for dispersing the light transmitted by said storage positions in an absorption spectrum having sectors corresponding to the storage positions of said column; and
means for analyzing the sectors of said absorption spectrum to determine the data content of the corresponding storage positions of said selected column.

3. The system of claim 2 wherein said recording elements are inorganic materials.

4. The system of claim 2 wherein said recording elements are rare earths.

5. A data storage system comprising:
means for storing data in a column of light transmitting storage positions utilizing a plurality of recording elements having distinctive spectral characteristics and combined in each storage position in accordance with a predetermined code;
means for applying light to said column of storage positions;
a filter associated with each storage position of said column for passing a distinct and non-overlapping band of said light through each storage position of said column;
means for dispersing the light transmitted by said storage positions in an absorption spectrum having sectors corresponding to the storage positions of said column; and
means for analyzing the sectors of said absorption spectrum to determine the data content of the corresponding storage positions of said column.

6. A data storage system comprising:
means for storing data in a plurality of columns of light-transmitting storage positions utilizing a plurality of recording elements each having distinctive spectral characteristics and combined in each storage position in accordance with a predetermined code;
means for selecting a particular column of storage positions;
means for applying light to said selected column of storage position;
a filter associated with each storage position of each said column of storage positions for passing a distinct and non-overlapping band of applied light through each storage position of the selected column;
means for dispersing the light transmitted by said storage positions in an absorption spectrum having sectors corresponding to the storage positions of said column; and
means for analyzing the sectors of said absorption spectrum to determine the data content of the corresponding storage positions of said selected column.

7. The system of claim 6 wherein said recording elements are inorganic materials.

8. The system of claim 6 wherein said recording elements are rare earths.

9. A data storage system comprising:
an $m$ x $n$ array of storage columns, each column having $p$ light-transmitting storage positions, said storage positions having coded combinations of elements exhibiting distinctive spectral characteristics;
means for selecting a particular column of storage positions;
means for applying light to said selected storage column;
means associated with such said column of storage positions for passing a distinct and non-overlapping band of applied light through each said storage position of said selected column;
means for dispersing the light transmitted by said storage positions in an absorption spectrum having sectors corresponding to the storage positions of said columns; and
means for analyzing the sections of said absorption spectrum to determine the data content of the corresponding storage positions of said selected column.

10. A data storage system comprising:
an $m$ x $n$ array of storage columns, each column having $p$ light-transmitting storage positions, said storage positions having coded combinations of elements exhibiting distinctive spectral characteristics;
a group of $p$ filters associated with each said column, a filter in each group corresponding to a different storage position in said associated column,
each filter within a group passing a different and non-overlapping band of light;
means for selecting a particular storage column;
means for applying light to said selected storage column;
means for collecting the light transmitted by the storage positions of said column;
means for dispersing said transmitted light in an absorption spectrum having sectors corresponding to the storage positions of said column; and
means for analyzing the sectors of said absorption spectrum to determine the data content of the corresponding storage positions of said selected column.

11. The system of claim 10 wherein said elements are inorganic materials.

12. The system of claim 10 wherein said elements are rare earths.

13. A data storage system comprising:
an $m$ x $n$ array of storage columns, each column having $p$ light-transmitting storage positions, said storage positions having coded combinations of elements exhibiting distinctive spectral characteristics;
a group of $p$ filters associated with each said column, a filter in each group corresponding to a different storage position in said associated column, each filter within a group passing a different and non-overlapping band of light;
means for applying light to a selected said storage column;
means for collecting the light transmitted by the storage positions of said column;
a spectroscope for dispersing said transmitted light in absorption spectrum having sectors corresponding to the storage positions of said column; and
means for analyzing the sectors of said absorption spectrum to determine the data content of the corresponding storage positions of said selected column.

14. A data storage system comprising:
means for storing data in a column of light transmitting storage positions utilizing a plurality of recording elements each having a distinctive spectral characteristic and combined in accordance with a predetermined code;
means for applying light to said column of storage positions;
means for dispersing the light transmitted by said storage positions in an absorption spectrum having sectors corresponding to the storage positions of said column; and
means for analyzing the sectors of said absorption spectrum to determine the data content of said column.

15. A data storage system comprising:
means for storing data in a plurality of columns of light transmitting storage positions utilizing a plurality of recording elements each having a distinctive spectral characteristic and combined in each column in accordance with a predetermined code;
means for selecting a particular column of storage positions;
means for applying light to said selected column;
means for dispersing the light transmitted by said storage positions in an absorption spectrum having sectors corresponding to the storage positions of said column; and
means for analyzing the sectors of said absorption spectrum to determine the data content of said selected column.

16. A data storage system comprising:
an *m* x *n* array of storage columns, each column having *p* storage positions, each said storage position including a filter, data in the form of coded combinations of elements exhibiting distinctive spectral characteristics, a column input light pipe and a column output light pipe, said filter for each storage position passing a band of light distinct from and non-overlapping with the bands for the filters associated with other storage positions of said column;
means for selecting a particular storage column;
means for applying light to said input light pipe of said selected column;
means for collecting light from said output light pipe of said selected column;
means for receiving said collected light and for dispersing said light in an absorption spectrum having sectors corresponding to the storage positions of said selected column; and
means for analyzing the sectors of said absorption spectrum to determine the data content of the corresponding storage positions of the selected column.

17. The system of claim 16 where the output light pipe of one storage column serves as the input light pipe of an adjacent storage column.

References Cited

UNITED STATES PATENTS

| | | | |
|---|---|---|---|
| 3,148,355 | 9/1964 | Sliter | 340—173 |
| 3,138,783 | 6/1964 | Toulmin. | |
| 3,196,393 | 7/1965 | Siegemund | 235—61.115 |

TERRELL W. FEARS, *Primary Examiner.*